(12) United States Patent
Krishnankutty

(10) Patent No.: US 6,892,256 B1
(45) Date of Patent: May 10, 2005

(54) AUTOMATED SYSTEM FOR STORING REVISION INFORMATION FROM SLAVE PROGRAMMABLE DEVICES IN A MASTER PROGRAMMABLE DEVICE

(75) Inventor: Jayakumar Krishnankutty, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 426 days.

(21) Appl. No.: 09/847,558

(22) Filed: May 1, 2001

(51) Int. Cl.[7] ............................ G06F 13/00; G06F 3/00
(52) U.S. Cl. ........................ 710/104; 710/16; 713/100
(58) Field of Search ...................... 710/8–16, 104; 713/1, 2, 100

(56) References Cited

U.S. PATENT DOCUMENTS

| | | | | |
|---|---|---|---|---|
| 5,179,670 A | * | 1/1993 | Farmwald et al. | 710/104 |
| 5,881,292 A | * | 3/1999 | Sigal et al. | 717/170 |
| 5,986,465 A | * | 11/1999 | Mendel | 326/39 |
| 6,009,409 A | * | 12/1999 | Adler et al. | 705/14 |
| 6,283,227 B1 | * | 9/2001 | Lerche et al. | 175/4.55 |
| 6,301,709 B1 | * | 10/2001 | Warmink | 713/1 |
| 6,442,446 B1 | * | 8/2002 | Nakamura et al. | 700/121 |
| 2002/0172220 A1 | * | 11/2002 | Baker et al. | 370/465 |
| 2003/0033514 A1 | * | 2/2003 | Appleby-Allis et al. | 713/100 |

FOREIGN PATENT DOCUMENTS

| | | | | |
|---|---|---|---|---|
| JP | 59058522 A | * | 4/1984 | G06F/3/00 |
| JP | 03294922 A | * | 12/1991 | G06F/9/06 |
| JP | 06051961 A | * | 2/1994 | G06F/9/06 |
| JP | 09146861 A | * | 6/1997 | G06F/13/00 |
| JP | 11096013 A | * | 4/1999 | G06F/9/445 |

* cited by examiner

*Primary Examiner*—Sumati Lefkowitz
(74) *Attorney, Agent, or Firm*—Sierra Patent Group, Ltd.

(57) ABSTRACT

A method and system for automatically updating the revision level of programmable devices is disclosed. In one aspect, the system may comprise a master programmable device having pulse receiving logic and memory, and one or more slave programmable devices having pulse generating logic. The slave devices may be coupled to the master device through an interface and configured to automatically send revision information to the master device responsive to the revision information being generated in a slave device.

5 Claims, 6 Drawing Sheets

AUTOMATED SYSTEM FOR STORING REVISION INFORMATION FROM SLAVE PROGRAMMABLE DEVICES IN A MASTER PROGRAMMABLE DEVICE

BACKGROUND

1. Field of the Disclosure

The present disclosure relates generally to programmable devices, and more particularly, to the programming and storing revision data in programmable devices.

2. The Background Art

The problems associated with keeping track of the revision levels of various programmable devices in a system are known in the art. Currently, there exists an indirect scheme of keeping track of programmable device revisions. FIG. 1 is an operational block diagram of a computer system 100 according to the prior art. The system 100 typically includes two types of programmable devices, such as independent programmable devices (PD) 102, 104, 106, and an EPROM 108 for storing revision information. Typically, PD 102–106 may comprise any field programmable gate array (FPGA) devices or Erasable Programmable Logic Devices (EPLDs) known in the art.

During the design cycle of a new product, PDs will typically be reprogrammed many times in an effort to de-bug and optimize the software residing in the various PDs residing in a given system. During reprogramming, the revision level of each PD present in a system must be accounted for and documented.

Typically, the engineer overseeing the system programming must keep track of the PDs revision through steps illustrated in FIG. 2. Prior to updating the PD, the system must be powered up in act 202. The PD may then be reprogrammed in act 204, and the system may then be restarted in act 206.

After the system has been reprogrammed and restarted, the engineer must then update the revision level of the various PDs present in the system by programming the EPROM with the appropriate revision data in act 208. Typically, this may be accomplished by using the command line interface (CLI) of the system or the like.

However, as can be seen from FIG. 2, the updating of the EPROM is a separate act from the programming of the system. Unfortunately, the act of updating the EPROM with the appropriate revision data is quite often forgotten, thereby wasting many man hours in the debugging a particular problem later traced to the programming of a programmable device with an older version of software than the one required to run the system appropriately.

It is therefore desirable to create a system or a method in which some of these required steps are eliminated or replaced with a simpler system or method, thereby reducing the risk of losing man-hours to debugging systems due to programming errors.

SUMMARY

A system for automatically updating the revision level of programmable devices is disclosed. In one aspect, the system may comprise a master programmable device having pulse receiving logic and a memory space operatively disposed therein; and at least one slave programmable device having pulse generating logic operatively disposed therein, the slave programmable device coupled to the master programmable device through an interface and configured to send revision information to the master programmable device.

A further aspect of the system may include a revision register containing one or more memory locations, each the memory location corresponding to a slave programmable device.

In another aspect of the system, the revision information comprises a pulse stream corresponding to the revision level of a slave programmable device.

A further system for collecting programmable device revision information is disclosed. In one aspect, the system may comprise means for sending, by the system, a reset signal to a master programmable device and at least one slave programmable device thereby placing all programmable devices in a known good condition; means for sending, by the slave programmable device, revision information to the master programmable device; means for receiving, by the master programmable device, the revision information; and means for storing, by the master programmable device, the revision information.

A method for updating programmable device revision information in a system having a master programmable device and at least one slave programmable device is disclosed. In one aspect, the method may comprise the acts of resetting all devices in the system; sending revision information from the slave programmable device to the master programmable device; and storing the revision information on the master programmable device.

DETAILED DESCRIPTION

Those of ordinary skill in the art will realize that the following description is illustrative only and not in any way limiting. Other modifications and improvements will readily suggest themselves to such skilled persons.

Figure 3A:
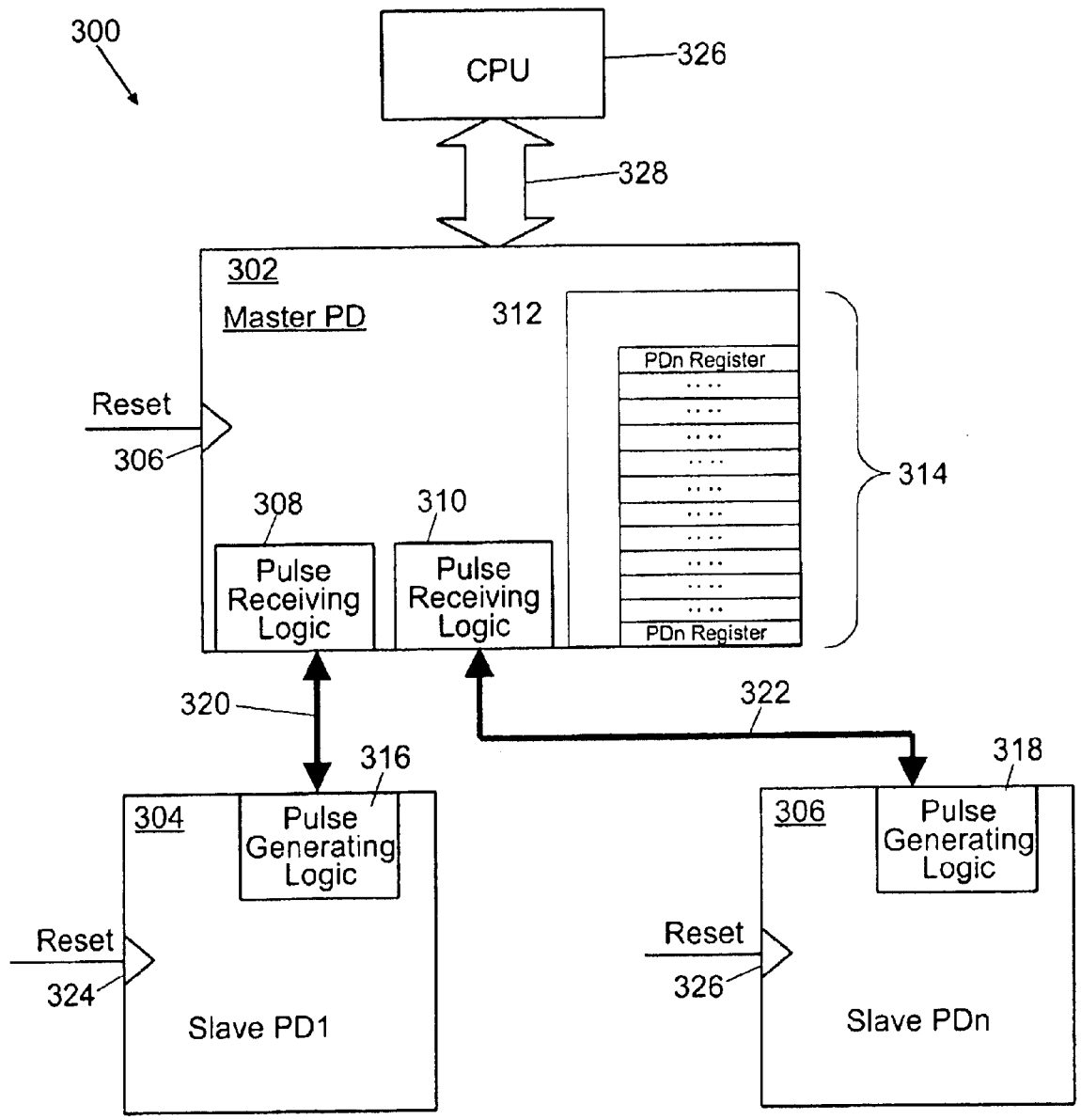
FIG. 3A is diagram of one aspect of the disclosed system showing a master programmable device coupled to one or more slave programmable devices.

FIG. 3A is an operational block diagram showing one aspect of a self-updating system 300 including a master programmable device 302 and one or more slave programmable devices PD1 304 through PDn 306. The slave PDs utilized in the disclosed aspects may be any PD known in the art, such as from ALTERA or XILINX. It is contemplated that the master PD 302 may be a Field Programmable Gate Array or an EPLD as is known in the art. It is to be understood that structure of FIG. 3A may be programmed in any manner that the designers of the system may contemplate.

The master PD 302 may be configured to receive a reset signal 306 as is well known to those of ordinary skill in the art such that when reset signal 306 is received, the master PD 302 will be reset to a pre-programmed known good condition.

The master PD 302 may further include one or more pulse receiving circuits 308 through 310 operatively disposed therein for automatically updating the revision levels of the one or more slave PDs PD1 304 through PDn 306. The function of the pulse receiving circuits 308 through 310 will be discussed in more detail below.

Figure 3B:
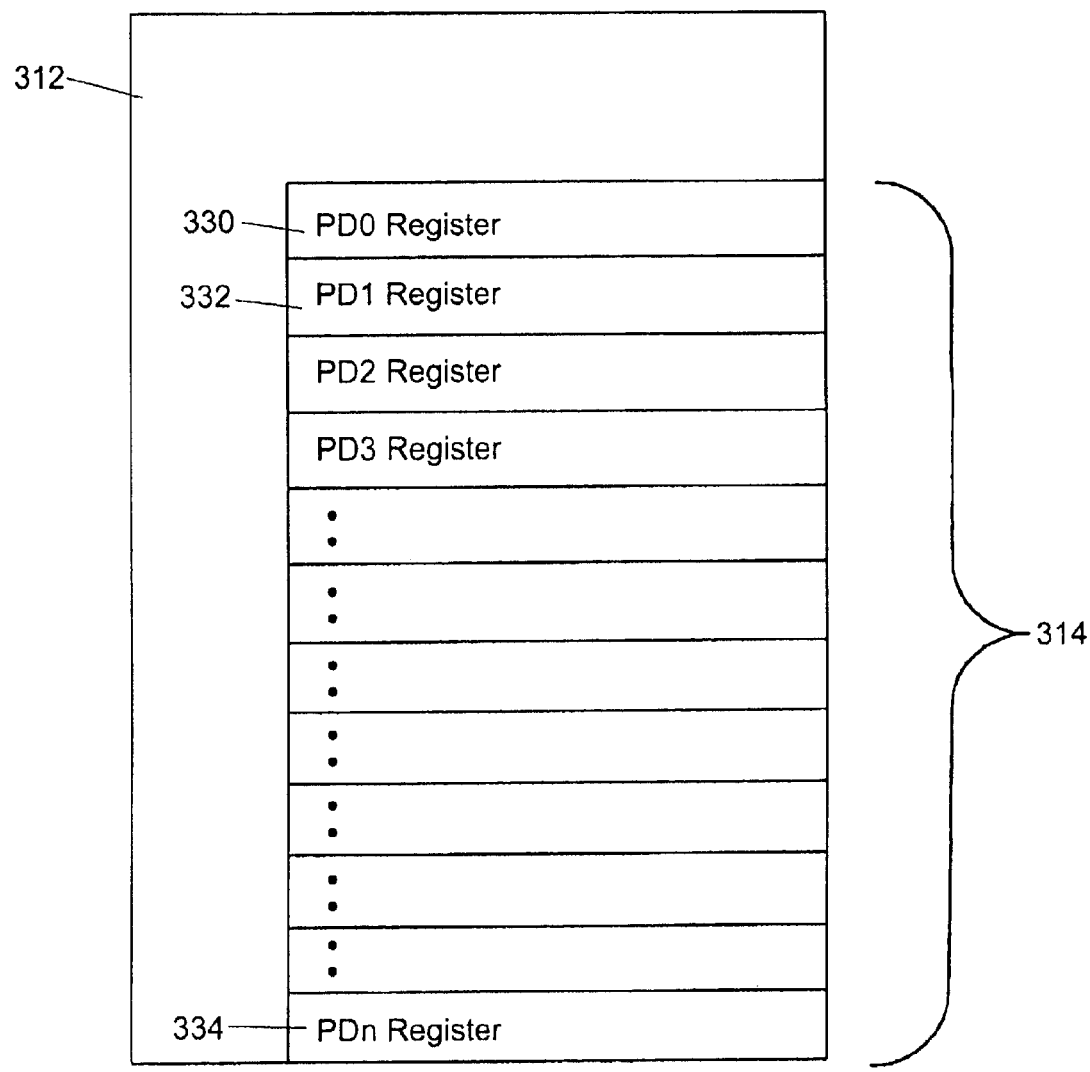
FIG. 3B is a diagram of a memory space configured in accordance with one aspect of the disclosed system.

The master PD 302 may further include a memory space 312 operatively disposed therein for storing revision information. The memory space 312 may further include a revision register 314 which includes memory address locations corresponding to PDs of system 300. Referring briefly to FIG. 3B, the revision register 314 may contain a plurality of memory address locations 330 through 334. It is contemplated that each memory location of the revision register 314 may correspond to a particular PD. For example, as can be seen from FIG. 3B, PD0, corresponding to the master PD in the system, may have its revision information stored in memory location 330, PD1 may have its revision information stored in location 332, and so on. It is contemplated that the revision data generated by any number of PDs may be stored in this manner.

The master PD 302 may be operatively coupled to a CPU 326 through a bus 328 as is known in the art for managing the operation of the disclosed system 300.

System 300 may further include one or more slave PDs PD1 304 through PDn 306 as in FIG. 3A. The slave PDs may also be configured to receive a reset signal such that they will be reset to a known good condition as is known in the art. The slave PDs PD1 through PDn may further include pulse generating logic 316 through 318, respectively, for generating revision data.

In the disclosed system 300, the logic 316 within the slave PD1 304 may be operatively coupled to the circuitry 308 of the master PD 302 through interface 320, and the logic 318 slave PDn 306 may be operatively coupled to circuitry 310 through interface 322. The interfaces 320 and 322 may comprise any interface suitable for communicating revision information, such as a wire, bus, or other conductive material. It is contemplated that interfaces 320 and 322 may also comprise links and associated hardware and software compatible with any communication protocol known in the art, such as a PCI-compliant communication bus, or links such as wireless or optical links known in the art. It is to be understood that any number of slave PDs may be coupled to the master PD 302 in this manner.

While the slave PDs of FIG. 3A are shown as residing on the same circuit board as the master PD, it is to be understood that other aspects of the disclosed system are possible. For example, it is contemplated that the slave PDs may reside on separate circuit boards, such as back cards, line cards, or daughter boards, without departing from the scope of the present disclosure. It is contemplated that in the case where a slave PD is present on a separate circuit board, the interface 320 may be accomplished through the use of the connector or interface used to couple the circuit boards. Additionally, distant PDs may be interfaced through links and associated hardware and software compatible with communication protocols known in the art, such as a PCI-compliant communication bus, or links such as wireless or optical links known in the art.

In the operation of one aspect of a disclosed system 300, the pulse generating logic 318 within a slave PD generates revision information after it receives a reset signal. The revision information is sent to the pulse receiving circuits within the master PD 302 through the interface 322, and on to a corresponding memory location within the memory space 312. This automatic process may be accomplished for each slave PD present in the system, ending with the revision information for the master PD and each slave PD is stored in one convenient location within the memory 312. This information may then be accessed by an engineer through means known in the art, such as a console, text editor or other programming tool.

Figure 1:
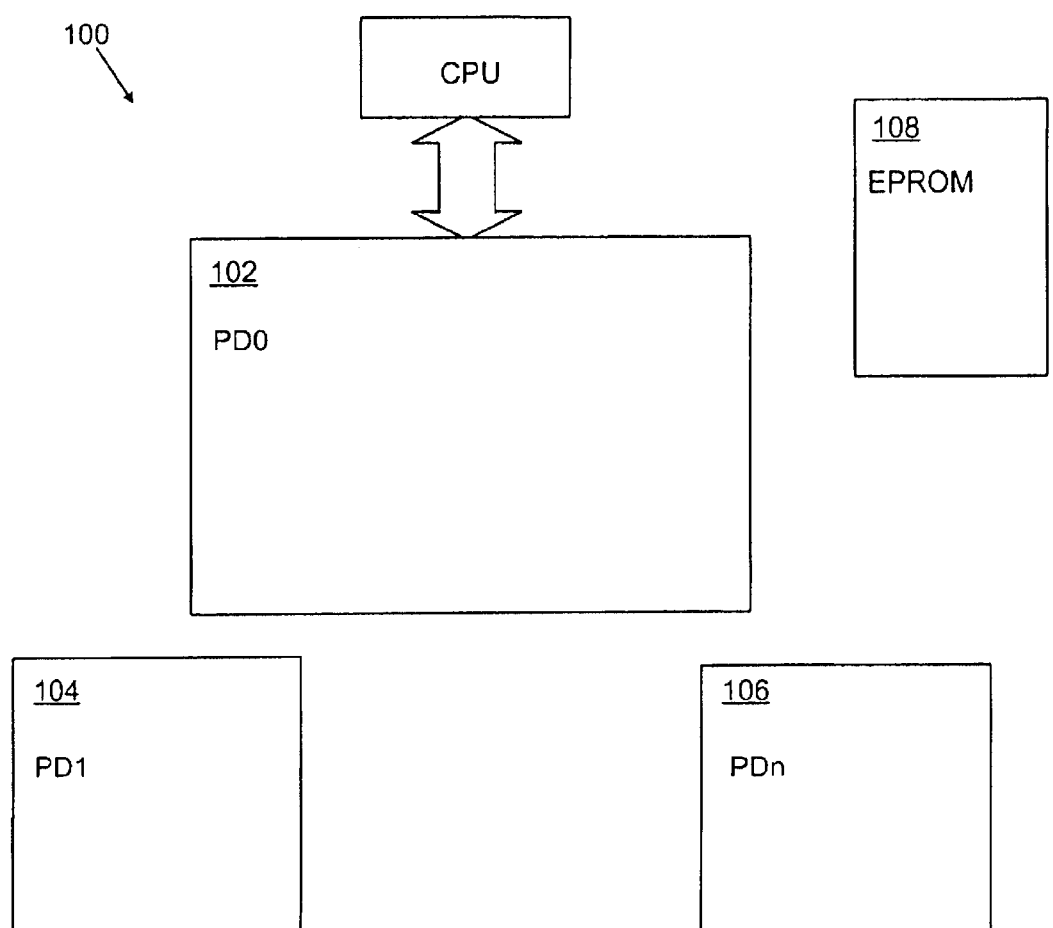
FIG. 1 illustrates an operational block diagram of the prior art depicting a plurality of programmable devices and an EPROM arrayed within a computer system.
Figure 2:
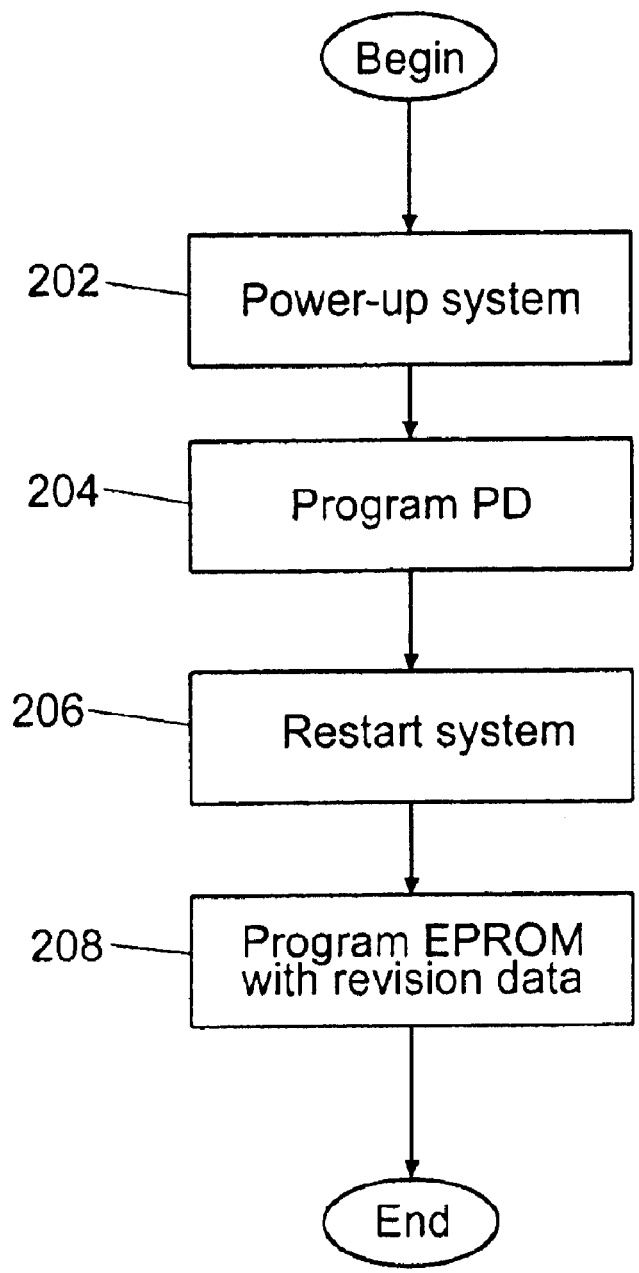
FIG. 2 is a flow chart showing the steps required to program revision information into a prior art system.
Figure 3C:
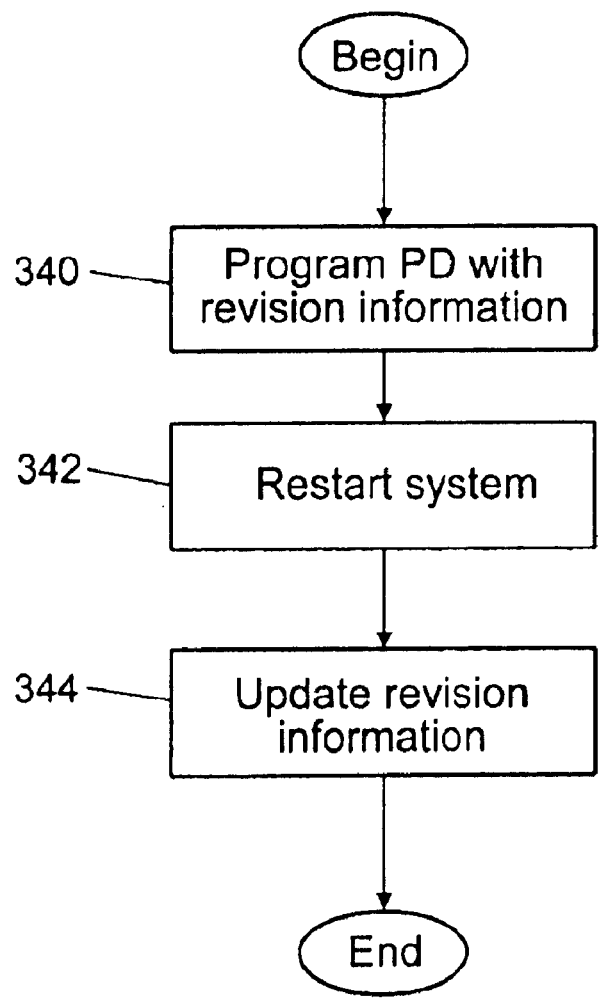
FIG. 3C is a flow chart of one aspect of the disclosed system.

FIG. 3C is flowchart showing a method according to one aspect of the disclosed system. The process of FIG. 3C begins in act 340, where the system is reprogrammed. In one aspect of the disclosed system, the revision information for each corresponding PD may also be programmed simultaneously with the reprogramming. The system may then be restarted in act 342, at which time a reset signal will be received by the components of the disclosed system. The system will then automatically update the revision information of the slave PDs of the system into the master PD in act 344. As will be appreciated by those of ordinary skill in the art, the method of the disclosed system represents a time savings over the prior art method described above and illustrated in FIG. 2, and the automatic updating of the disclosed system eliminates the possibility that the engineer will forget to program the correct PD revision data. The extra step of programming a separate EPROM with revision data is eliminated. Additionally, the cost associated with having a separate EPROM to store revision information is also eliminated.

Figure 4:
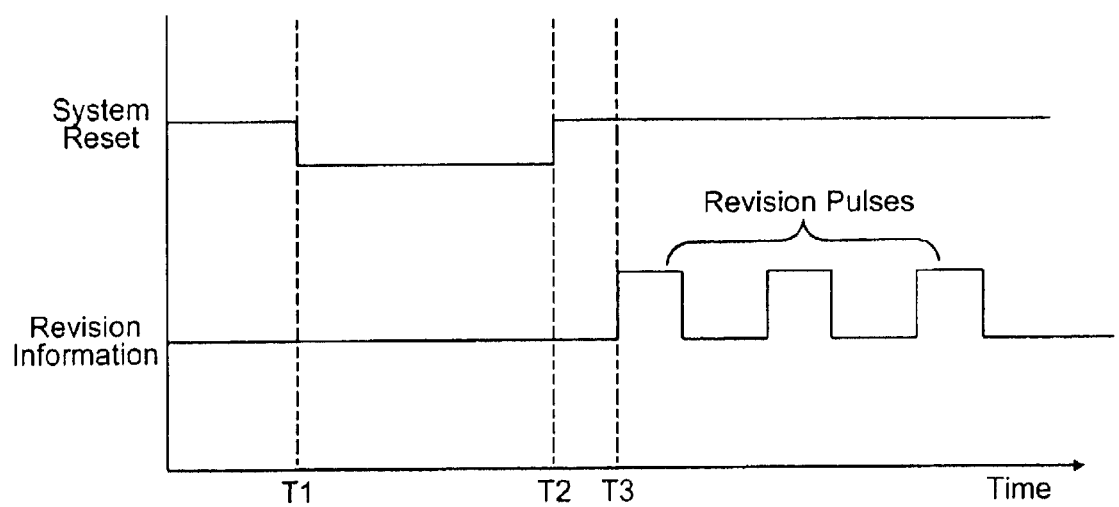
FIG. 4 is a diagram showing impulses generated in accordance with one aspect of the disclosed system.

FIG. 4 is a diagram showing the system reset signal and the revision information signal along a common time axis. The system 300 generates a reset signal at time marker T1, placing the system in a known good condition. When the reset signal ends and toggles positive at time marker T2, the slave PD may send revision information at time marker T3 to the master PD. In a four-bit revision encoding scheme aspect of the disclosed system, this process may take only four clock-periods of time after time marker T2, where time marker T2 and T3 are separated by one clock-period of time if FIG. 4.

In a further aspect of the disclosed system, the revision information is generated by the pulse generating circuitry of the corresponding PD. It is contemplated that the pulse generating circuitry may comprise a portion of the corresponding PD's circuitry programmed using means known in the art. In a further aspect of the disclosed system, the revision information comprises a pulse stream having a count corresponding to the revision level of the PD. Thus, in FIG. 4, the three pulses represent that the PD is currently in its third revision. It is to be understood that the revision information may be transmitted in any form known in the art suitable for communicating the revision information from a slave PD to a master PD. For example, the revision information may comprise a pulse count, a binary-coded decimal, an ASCII character, or any other suitable code.

The revision information may then be received by the receiving circuitry of the master PD. In one aspect of the disclosed system, the receiving circuitry comprises a portion of the master PD's circuitry programmed to receive the revision information using methods known in the art. It is contemplated that the receiving circuitry may also comprise circuitry known in the art configured to count the pulses received from each PD, such as counters or flip-flops. It is further contemplated that the CPU and associated circuitry may be configured to manage the storage and retrieval of the revision information.

While the above is a complete description of one aspect of the disclosed system, various alternatives, modifications, and equivalents may be used. Therefore, the above description should not be taken as limiting the scope of the disclosure as defined by the appended claims.

What is claimed is:

1. A system for automatically updating the revision level of programmable devices comprising:

a master programmable device having pulse receiving logic and a memory space operatively disposed therein, wherein said master programmable device is a one of group consisting of a field programmable gate array and an erasable programmable logic device and wherein said memory space includes a revision resister containing one or more memory locations, each one of said memory locations stores revision information for corresponding to one at least one particular slave programmable device, the revision information including the revision number of the software used to configure said at least one slave programmable device; and at least one slave programmable device having pulse generating logic operatively disposed therein, said slave programmable device coupled to said master programmable device through an interface and configured to send revision information to said master programmable device responsive to generating said revision information in response to receiving a reset signal wherein said at least one slave programmable device is a one of group consisting of a field programmable gate array and an erasable programmable logic device.

2. The system of claim 1, wherein said revision information comprises a pulse stream corresponding to the revision level of a slave programmable device.

3. A system for collecting programmable device revision information comprising:

means for sending, by said system, a reset signal to a master programmable device and at least one of a plurality of slave programmable devices thereby placing all programmable devices in a known good condition;

means for sending, by said at least one of a plurality of slave programmable devices, revision information to said master programmable device the revision information including the revision number of the software used to configure said at least one slave programmable device;

means for receiving, by said master programmable device, said revision information from each of said at least one of a plurality of slave programmable devices; and means for storing, by said master programmable device, said revision information from each one of said at least one of a plurality of slave programmable devices in one memory location in a revision register that is dedicated to storing said revision information of said each one of said at least one of a plurality of slave programmable slave devices.

4. The system of claim 3 wherein said revision information comprises a pulse stream corresponding to the revision level of a slave programmable device.

5. A method for updating programmable device revision information in a system having a master programmable device wherein said master programmable device is one of a group consisting of a field programmable gate array and an erasable programmable logic device and at least one of a plurality of slave programmable devices wherein said at least one of a plurality of slave programmable devices is one of a group consisting of a field programmable gate array and an erasable programmable logic device, comprising:

receiving a reset signal in said at least one of a plurality of slave programmable devices;

generating revision information in said at least one of a plurality of slave programmable devices responsive to receiving said reset signal the revision information including the revision number of the software used to configure said at least one slave programmable device;

sending said revision information from each of said at least one of a plurality of slave programmable devices to said master programmable device; and storing said revision information from each one of said at least one of a plurality of slave programmable devices on said master programmable device in one memory location in a revision register that is dedicated to storing said revision information of said each one of said at least one of plurality of slave programmable slave devices.

* * * * *